June 21, 1938. O. F. BLEDSOE 2,121,495
PROCESS OF STORING COTTON AND THE LIKE
Filed Feb. 18, 1935 4 Sheets-Sheet 1

Inventor
Oscar F. Bledsoe
By Richard K. Stevens
Attorney

June 21, 1938.    O. F. BLEDSOE    2,121,495
PROCESS OF STORING COTTON AND THE LIKE
Filed Feb. 18, 1935    4 Sheets-Sheet 2
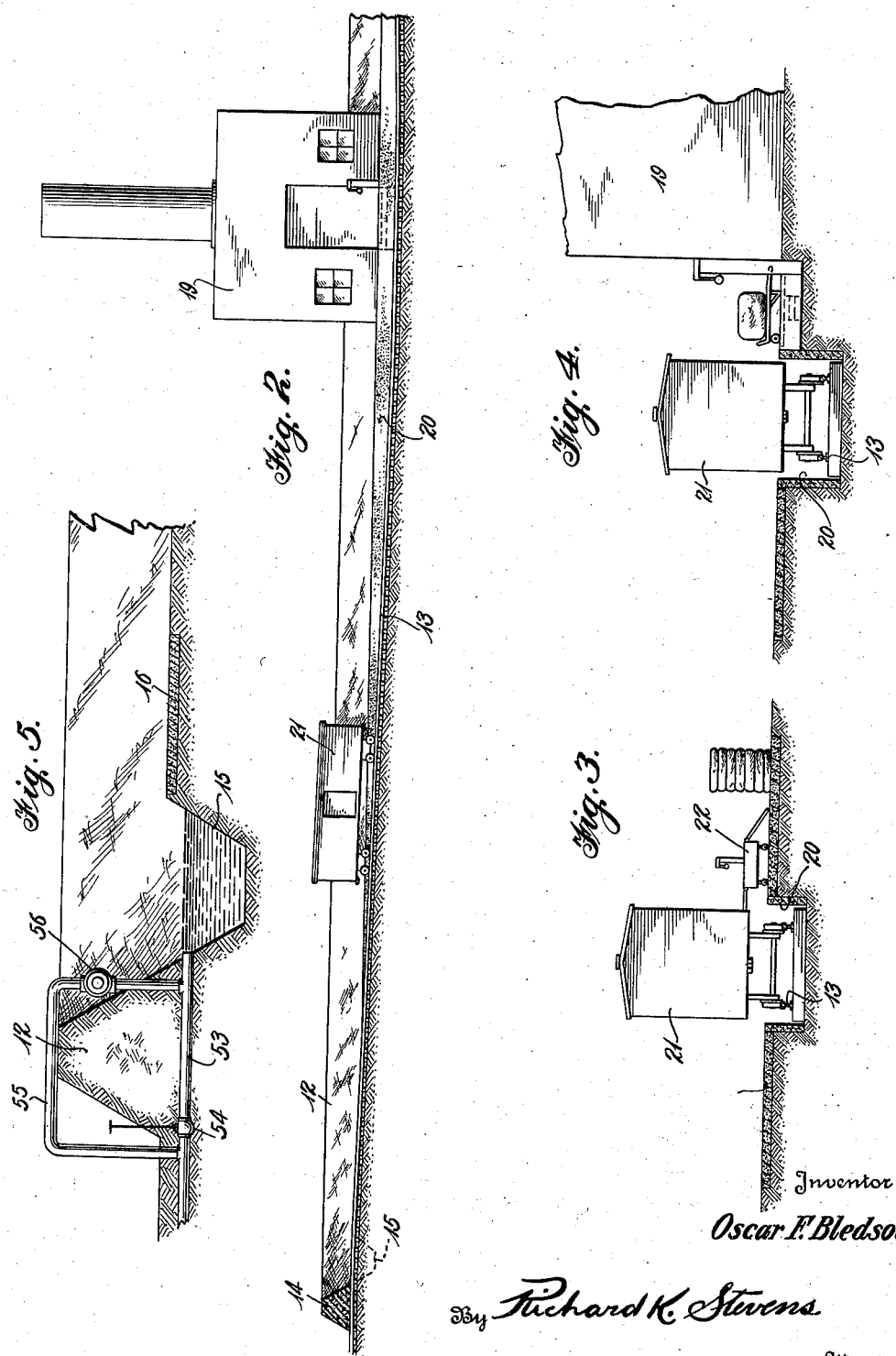
Inventor
Oscar F. Bledsoe
By Richard K. Stevens
Attorney June 21, 1938.　　　　O. F. BLEDSOE　　　　2,121,495
PROCESS OF STORING COTTON AND THE LIKE
Filed Feb. 18, 1935　　　4 Sheets-Sheet 4
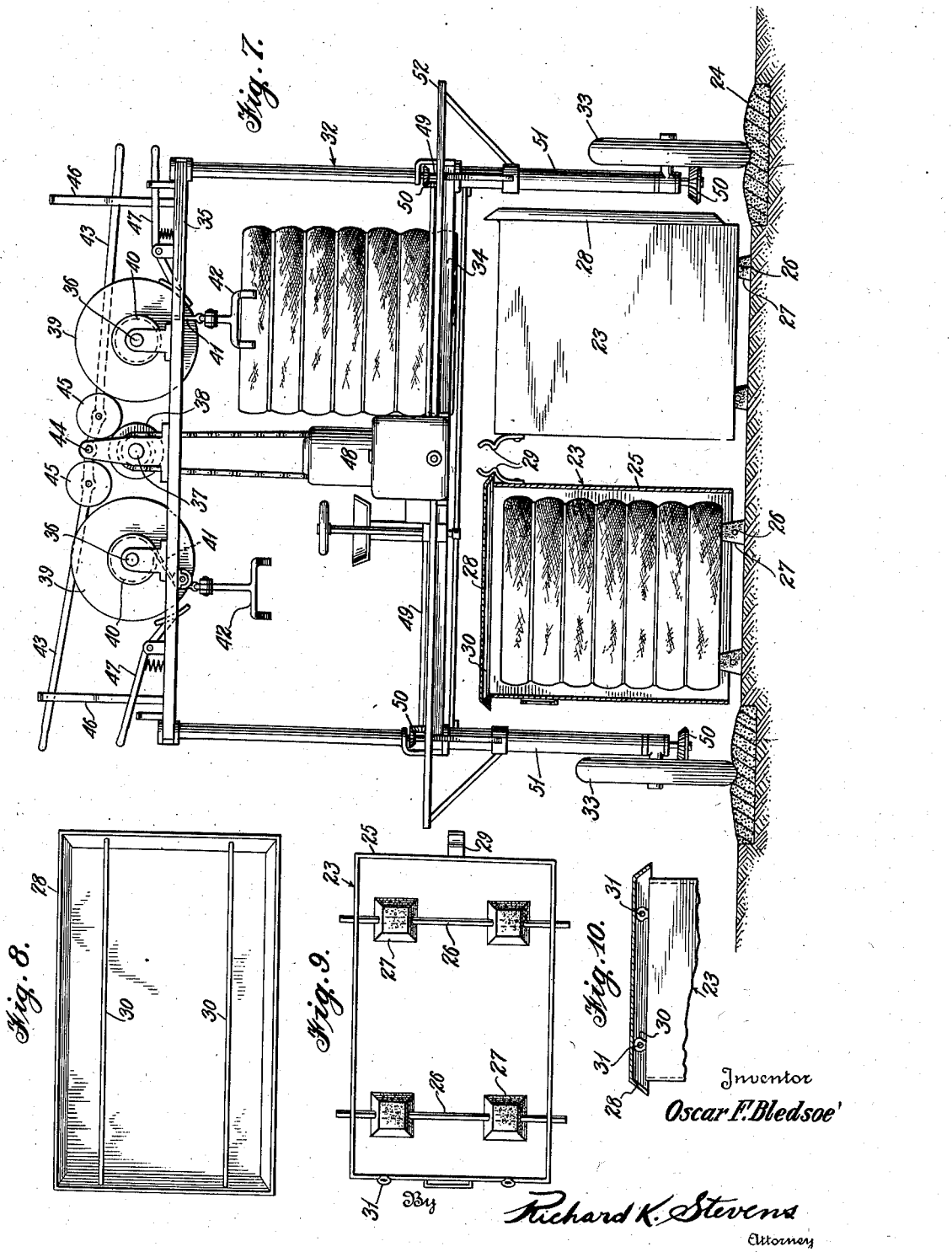

Patented June 21, 1938

2,121,495

UNITED STATES PATENT OFFICE 2,121,495

PROCESS OF STORING COTTON AND THE LIKE

Oscar Fitzalan Bledsoe, Greenwood, Miss.

Application February 18, 1935, Serial No. 7,110

2 Claims. (Cl. 21—4)

This invention relates to the handling of cotton or similar materials, the invention particularly involving the handling and storage of baled cotton and the like which presents serious problems when stored in large quantities in the customary manner due to the inflammable nature thereof. Additionally the invention involves the storage of the bales of cotton in contact with air which is sufficiently humid to cause the moisture content of the cotton to be continuously maintained to a degree which will prevent the drying of the natural oil therefrom, and, therefore, the cotton which is spun into yarn within a reasonable time after removal from storage will have retained its natural oil and its initial tensile strength.

Since cotton is grown and harvested annually, it is necessary that a large portion of the crop be stored until such time as it is purchased and transported to the mills for spinning into yarn and subsequent operations. During normal years in the past the cotton after being subjected to a ginning operation has been pressed into bales and placed in storage where the bales were averagely maintained for a period of between six and eight months because of the inability of the mills to more quickly spin the entire crop of cotton produced or because the demand for cotton yarn did not warrant an increased production. It has been customary to store the bales of cotton in warehouses which have been particularly constructed for that purpose, and, since a bale of cotton as initially pressed is normally twenty-seven inches by fifty-four inches by forty-eight inches and weighs approximately five hundred pounds, it has been found that the large space required for the storage of the bales results in such investments in the erection and maintenance of the warehouses that a reasonable storage charge covering the long average period of storage necessitates a charge to the grower which is extremely burdensome.

Many warehouses have been constructed of wood or other rather low cost material with the view to maintaining a low initial investment, but, since in the use of such warehouses there is an ever present threat of conflagration, the insurance rates are of necessity so high that the total storage charge to the grower is burdensome. It will be seen that where there is a relatively high initial investment in the construction of a warehouse having certain safeguards for the protection of the cotton, the total storage charge must be an important factor to the grower notwithstanding the fact that the rate of insurance is materially reduced, whereas, if a low cost warehouse is constructed without the recognized safeguards, then the total storage charge is still burdensome to the grower because of the increased risk assumed by the insurer and the resultant increased insurance rate.

As the better constructed warehouses are preferred notwithstanding the initial cost thereof, the tendency has been toward erecting such warehouses while utilizing the available space to the fullest extent. It has, therefore, become the custom to closely position the bales within the warehouses as well as to stack them in double tiers, but such packing of the bales increases the likelihood of conflagration, the bales when so positioned being particularly subject to "flash" fire. Then, too, when the bales are closely stacked they themselves constitute obstacles when an attempt is being made to extinguish a fire upon the discovery of one in the warehouse. In the handling of bales of cotton in storage it is necessary that they be sampled and reweighed at desired times and the tendency to closely stack the bales in double tiers results in the handling of many bales which would not have to be moved if it were practicable to position the bales so that they would all be readily available for sampling and reweighing.

In view of the tendency to closely pack the bales in the warehouses, rules have been promulgated by the insurance companies and the risk assumed with respect to one conflagration is limited to not more than five thousand bales of the cotton. "Fire walls" are therefore necessary between the storage warehouse accommodating five thousand bales of cotton and another closely adjacent warehouse. Sprinkler systems for extinguishing fires within the warehouse have also been installed in many of the warehouses, but this additional cost tends further to increase the legitimate storage charges.

It is an object of the present invention to overcome the problems heretofore encountered in the storage of cotton and the like, and the invention contemplates the provision of a storage plant in which the bales of fibers are stored in unit warehouses, which warehouses are positioned within an elevated confining means capable of protecting the stored cotton against damage by flood waters while humid air resulting from the diffusion of water within the area enclosed by the confining means is maintained therein and is caused to be passed in contact with the stored bales.

This invention further provides a method of handling cotton which includes the prolonged storage thereof while preserving to the fibers a tensile strength substantially equal to their initial tensile strength and the method comprising the steps of drying the cotton after picking until it is sufficiently dry to permit smooth ginning without objectionable napping when subjected to the usual ginning operation, then promptly, before the oil naturally occurring in the fibers is evaporated therefrom, subjecting the fibers to humid air to bring the moisture content of the same to such a degree as to avoid evaporation of the natural oil, and thereafter maintaining the moisture content of the fibers substantially constant by subjecting the same to contact with humid air until shortly prior to the shipment of the cotton to the mill for the spinning thereof.

As contemplated in one detailed form of the system of this invention, the unit warehouses are arranged in transverse rows with respect to a centrally positioned railroad track and compressor and pairs of these rows of warehouses are separated from adjacent pairs thereof a sufficient distance to permit a hoist type truck to pass over the warehouses of any of the pairs of rows so that the bales may be deposited in or hoisted from any desired warehouses, the bales being transported from or to a desired point without the necessity of handling or otherwise disturbing the bales in other of the warehouses. Furthermore, the unit warehouses are each provided with removable covers, and they are further provided with ventilating openings adjacent the bottoms and the tops thereof.

Other objects and advantages will be apparent from the following detailed description when considered in connection with the accompanying drawings wherein:—

Fig. 2 is a sectional view taken on line 2—2 of Fig. 1;

Fig. 3 is a sectional view taken on line 3—3 of Fig. 1;

Fig. 4 is a sectional view taken on line 4—4 of Fig. 1 at the central portion of the enclosure adjacent the bale compressor;

Fig. 5 is a detailed sectional view through the dike and moat illustrating the pumping systems for maintaining the water in the moat at the desired level;

Fig. 7 is a front view of the truck illustrating the manner in which its wheels are spread so as to pass over a pair of rows of the warehouses, one of the warehouses being shown in section;

Fig. 8 is a view illustrating the underside of one of the unit warehouse covers;

Fig. 9 is a plan view of one of the warehouses with its cover entirely removed; and Fig. 10 is a transverse sectional view through the upper portion of one of the warehouses.

Figure 1:
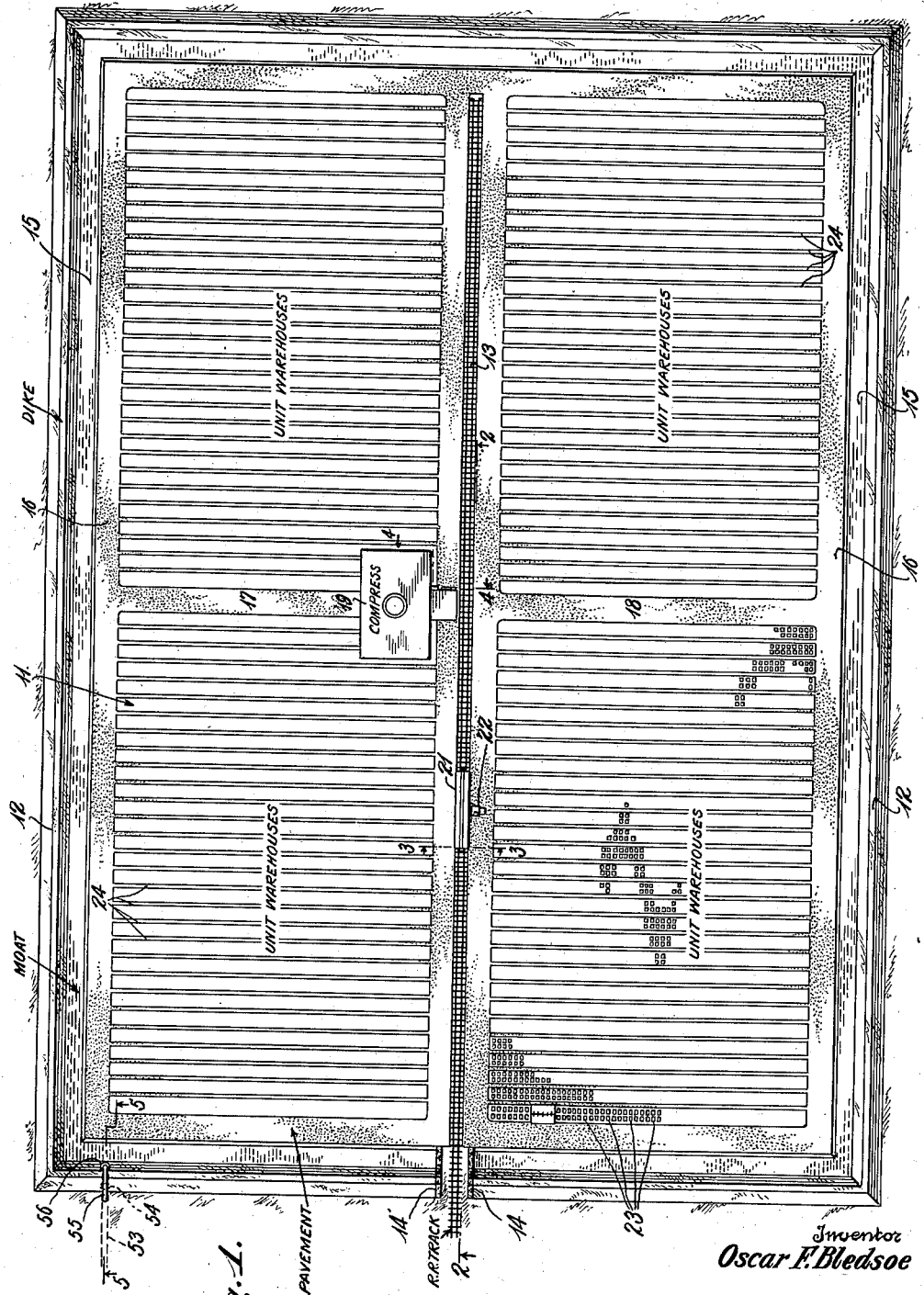
Fig. 1 is a diagrammatic plan view of one form of storage plant constructed in accordance with this invention.
Figure 6:
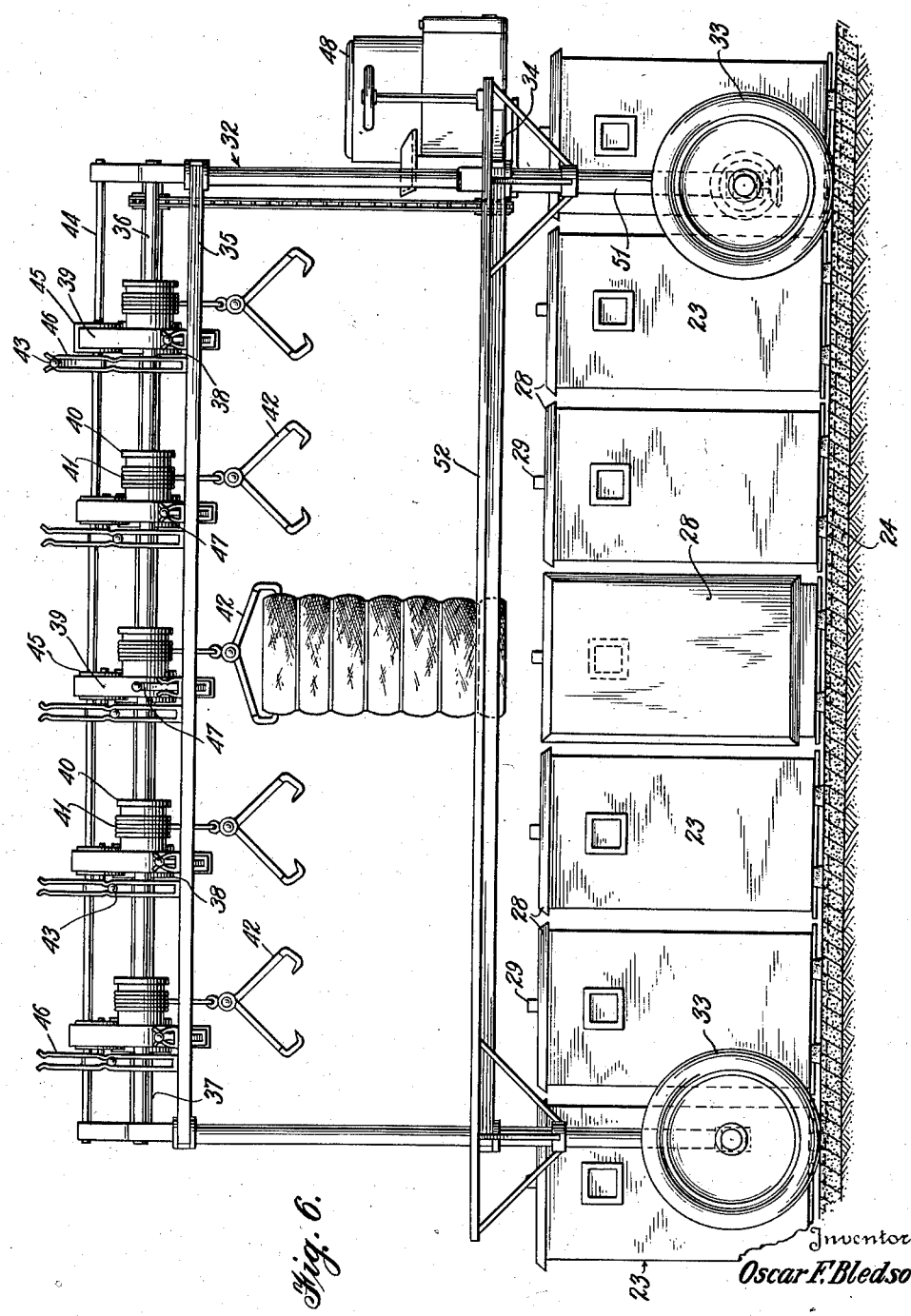
Fig. 6 is an enlarged view of a series of unit warehouses showing the hoist truck in position thereover with a bale being removed from one of the warehouses.

Now in referring to the drawings in detail and particularly to Fig. 1, the numeral 11 designates the storage plant generally, a dike 12 being provided so as to completely surround the same except for an opening therein provided for the entrance of a railroad track 13. The track 13 extends substantially across the entire area of the plant as defined by the dike.

Since I have found that it is preferable to locate the storage plant on low ground because of the normal humidity of the air at such levels, dike 12 affords protection for the plant in the event of floods and also forms a wind break which tends to inhibit the normal breezes from blowing moisture laden air from the plant area.

The dike is preferably reinforced with concrete walls 14 or the like where it is cut away to provide an opening for the railroad track 13 so that in the event of a flood during which the dike is surrounded by flood water, sand bags or other temporary water blocking material may be piled on the track between the walls 14. It is intended that the dike for any given plant be built to a height approximately four feet above the record flood level previously encountered in the particular plant location, and in the construction of the dike, the material dug in the formation of a moat 15 is readily available for that purpose.

Moat 15 preferably extends from one side of the track 13 at the place where it passes between the walls 14 in the dike, entirely around the plant area immediately adjacent the dike, and water for filling the moat may be obtained from any convenient source, but it is desirable to obtain the supply from artesian wells drilled within the plant area.

In the plant specifically set forth in Fig. 1, a pavement is constructed as at 16 adjacent to the moat 15 and extends for the full length of the moat. Pavements also extend along both sides of the track 13, and pavements are provided at 17 and 18 so that they will intersect the track about midway of the plant area. Adjacent the point of the intersection of pavements 17 and 18 with track 13, a compress 19 is located, the compress being utilized for compressing bales of cotton to a reduced size, particularly when the bales are to be thereafter shipped to distant points for processing.

Track 13 where it passes through the dike between walls 14 is at the same level of the area surrounded by the moat, but as shown in Fig. 2, the track is gradually lowered into a channelway 20 in order to facilitate the unloading and loading of the bales from and onto railway cars which may be brought into the plant from an outside railroad. In the position shown in Fig. 3 the floor of the car 21 is caused to be aligned with the platform of a scale 22, which scale is mounted on wheels and is movable to different locations along the pavement. The utility of the scales and the compress in the operation of the plant will be hereinafter more fully referred to. It will be seen that track 13 adjacent the compress is lowered to a level where the bottom of the car is caused to be in the same plane as the pavement whereby compressed bales of cotton or the like may be readily carted into the car for shipment from the plant.

Unit warehouses 23 are arranged in rows which extend transverse with respect to the railway track 13, and the rows of unit warehouses are so spaced that each two rows are closely adjacent, while each of the closely adjacent pair of rows of warehouses are separated from other pairs of rows by a narrow pavement 24 which extends the full length of the rows and connects with the pavements bordering the track and moat respectively. The unit warehouses are preferably constructed in the form having metal side walls 25, which are supported with the lower edges thereof in spaced relation to the ground by means of transversely extending bars 26. The bars in turn are secured in elevated position by being embedded in concrete piers 27. As will be seen upon considering Fig. 7 of the drawings, the upper surfaces of the piers in each warehouse constitute supports for a bale of cotton or the like, and these unit warehouses are constructed of such size that a passageway exists between the exterior of a stored bale and the warehouse walls.

In the preferred form of the invention each warehouse is provided with a cover 28 which is capable of being moved to an inoperative position by first being released from the clamp 29 and thereafter being moved transversely to a point where the free edge of the cover will swing downwardly and lie close against the side of the warehouse. The covers 28 are secured to their respective warehouses by means of bars 30 which extend across the underside of the cover and through eyelets 31 positioned upon the side wall 25 remote from the clamp 29. When the covers are in operative position their respective bars 30 are frictionally held in the eyelets 31 until the opposite ends thereof are slightly elevated, whereupon the rods may be moved freely within the eyelets and the covers can be moved to the position referred to above.

A hoist truck 32 of any desirable construction is utilized in the plant, but this truck 32 should be of a wide gauge so that the wheels 33 thereof may run on the separate pavements 24, while the truck platform 34 passes above unit warehouses 23 in the rows between said pavements.

Truck 32 is provided with hoisting mechanism mounted upon an elevated framework 35. This mechanism is formed with two stationary parallel shafts 36, and a central driving shaft 37. The shaft 37 is provided with a series of friction gears 38, whereas the shafts 36 are provided with freely rotatable corresponding friction gears 39. Each of the gears 39 has a winding drum 40 affixed thereto and the respective drums each has a cable 41 secured thereto with their free ends supporting a grapple iron 42. A lever 43, adapted for use in connection with each of the gears 39, is pivoted to a bar 44 supported by the framework 35. Each of said levers 43 has pivoted thereto an idle friction roller 45, which is adapted to be raised and lowered when its respective lever is moved about the bar 44. Spring clamps 46 are arranged for supporting the free ends of the levers 43 in operative or inoperative position as desired. When the levers are lowered their respective friction gear 45 is caused to engage with the gears 38 and 39 corresponding thereto to thereby cause a driving of the gear 39 and the resultant movement of its winding drum 40. The shaft 37 is, of course, adapted to be reversed by means of any of the usual reversing mechanisms (not shown) and the grapple irons are respectively adapted to deposit a bale of cotton held thereby into a unit warehouse, or to remove a bale from the warehouse depending upon the direction of rotation of the winding drums. Each of the friction gears 39 has associated therewith a braking device 47, which device is adapted to be applied for holding the winding drum against rotation when a bale of cotton has been drawn upwardly to the position shown in Fig. 7, or when the bale is being lowered.

The hoisting and lowering mechanism, as referred to, is driven by a motor 48, which motor is also utilized as the power means for propelling the truck to permit transporting of the baled cotton to and from the unit warehouses which are to be loaded or unloaded. In the form illustrated, the power is transmitted to the wheels by means of shafts 49 and gearing 50. The vertical shafts 49 for transmitting power to their respective wheels are encased in tubes 51, which tubes are mounted for oscillation, and constitute the supports for the truck body as well as the means for steering the respective wheels. Any well known type of steering mechanism may be employed. For the convenience of the workman, the platform is preferably extended entirely around the truck as indicated at 52.

In practicing the method of handling the material, particularly the handling of cotton, the cotton after harvesting is permitted to dry so that the moisture content thereof is lowered to a degree which will permit smooth ginning. The cotton is then subjected to the ginning operation and immediately thereafter it is baled and transported to the plant as shown in Fig. 1 of the drawings. The bales are received at the plant on cars passed over the track 13, the cars being preferably stopped at a position substantially as indicated in Fig. 3. Weighing scales 22 are placed in front of the door of the car being unloaded so that as each bale is unloaded the weight thereof can be noted and recorded. The bales are then placed on the pavement and the truck 32 is brought thereover, and each of the bales is then elevated by one of the grapple irons 42 in the manner above referred to. While the bales are being hoisted for transportation by the truck an operator passes down the rows of unit warehouses in which the particular bales are to be stored, and uncovers those warehouses which are to be utilized by moving the respective covers 28 to a position where they extend down the sides of the respective warehouses. The truck is then brought over a pair of rows of warehouses in the manner indicated in Fig. 7, and it is brought to a position over the uncovered warehouses and one bale of cotton is placed within each of the uncovered warehouses wherein it is supported upon the piers 27.

A record is made as to the bale deposited in a particular warehouse, and after the truck has been moved beyond the filled warehouse, its cover is then moved into operative position. After the truck has deposited all of the bales which it obtained from a new shipment, it is then returned to the point adjacent the car for a further load of bales. Since it is customary to sample and reweigh the bales during the period of storage, it is obvious that by keeping accurate records, a truck after partially or fully unloading the bales carried thereby, may be utilized for withdrawing other bales from the unit warehouses and transporting the same to a position for sampling and reweighing before returning them to designated warehouses.

The newly stored bales having been promptly brought from the ginning operation, are subjected to the humid air present within the plant area as are all of the other bales of cotton in storage. As the moat is filled with water, and since the dike acts as a windbreaker, the air within the plant area is maintained of a desired humidity. The air is circulated in contact with the bales by being passed under the edges of the walls 25 of the unit warehouses, and then upwardly around the bales within the warehouses and outwardly through the openings provided around the respective covers 28, as will appear particularly in Fig. 10 of the drawings. It will be understood that the air is caused to circulate through the unit warehouses by means of convection, and this "stack draft" effect is increased during the day when the sun tends to heat up the interiors of the unit warehouses.

Due to this arrangement the newly stored bales of cotton are promptly humidified so that the moisture content thereof is brought up to a degree which will prevent the evaporation of the natural oils occurring in the cotton. As the bales of cotton are then maintained with the desired moisture content during the entire period of storage, there is no tendency for the natural oils to evaporate from the cotton. The bales are then removed and subjected to compression in the compress just prior to the placing of the same on cars for shipment to the mills for spinning and subsequent operations. This conditioning of the cotton fibre has been found to cause the cotton to have a tensile strength equivalent to its initial tensile strength.

In the event of a flood occurring in the vicinity of the plant, the space between the walls 14 in the dike is blocked so that the water is excluded from the interior or plant area and the bales in storage are thereby protected against flood damage. When the water on the exterior of the dikes is so high as to prevent natural drainage of excess water from the moat, a pumping system such as shown in detail in Fig. 5 may be utilized for pumping the excess water out of the moat. Such a system is formed with a drain 53, which is adapted to be shut off by a valve 54, and a by-pass pipe 55 is provided so that excess water may be pumped therethrough by means of a pump 56 in the event of flood water existing exteriorly of the dike.

While under all normal conditions the moat is considered sufficient for effecting humidification of the air within the plant area, it may be desirable in extremely dry seasons to employ a spraying system in the form of pipes extending below the ground and throughout the plant area, which pipes are formed with nozzles spaced at intervals within the plant area so that water can be sprayed upwardly from the ground and thereby effect humidification of the air as well as effect moistening of the ground with resultant subsequent humidification of the air.

The platform 52 of the truck 32 is so elevated that the truck operators may readily look over all of the surrounding unit warehouses, and, therefore, it is only necessary that the warehouses be uncovered in order for the truck operators to readily ascertain the warehouses into which certain bales are to be stored. This makes it unnecessary to utilize special flagging systems.

While this invention has been described in detail in connection with the particular plant illustrated in the drawings, it is to be understood that it is not intended that the invention be considered to be so limited.

What I claim is:

1. A method of treating baled cotton in storage which comprises storing the bales in individual ventilated containers wherein substantially the entire surface of the bale is subjected to continuous exposure of humidified atmosphere and maintaining a degree of humidity in the atmosphere whereby the moisture content of the cotton will be maintained to inhibit evaporation of oils from the cotton.

2. A method of treating cotton which comprises the steps of drying, ginning and baling the cotton and thereafter storing the dried cotton in individual ventilated containers and subjecting substantially the entire surface of the bales to continuous exposure of humidified atmosphere and controlling the humidity of the atmosphere whereby the moisture content of the cotton will be raised so that the evaporation of naturally occurring oils from the cotton will be inhibited.

OSCAR FITZALAN BLEDSOE.